(12) United States Patent
Lord (10) Patent No.: US 11,065,948 B2
(45) Date of Patent: Jul. 20, 2021

(54) VEHICLE POWERTRAIN (71) Applicant: VOLVO TRUCK CORPORATION, Gothenburg (SE)

(72) Inventor: John Lord, Olofstorp (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 590 days.

(21) Appl. No.: 15/774,298

(22) PCT Filed: Nov. 9, 2015

(86) PCT No.: PCT/EP2015/076037
§ 371 (c)(1),
(2) Date: May 8, 2018

(87) PCT Pub. No.: WO2017/080571
PCT Pub. Date: May 18, 2017

(65) Prior Publication Data
US 2020/0215894 A1    Jul. 9, 2020

(51) Int. Cl.
*B60K 6/48* (2007.10)
*B60K 1/02* (2006.01)
(Continued)

(52) U.S. Cl.
CPC .............. *B60K 1/02* (2013.01); *B60K 6/547* (2013.01); *B60K 17/08* (2013.01);
(Continued)

(58) Field of Classification Search
CPC ..... B60K 6/48; B60K 1/02; B60K 2006/4825
(Continued)

(56) References Cited

U.S. PATENT DOCUMENTS 8,701,523 B2 * 4/2014 Zerbato ................. B60K 6/547
74/661
9,132,832 B2 * 9/2015 Ichikawa ................. B60K 6/26
(Continued)

FOREIGN PATENT DOCUMENTS

| CN | 102788118 A | 11/2012 |
| CN | 103072460 A | 5/2013 |

(Continued)

OTHER PUBLICATIONS

China Office Action dated Sep. 15, 2020 in corresponding China Application Patent Application No. 201580084423.9, 16 pages.
(Continued)

*Primary Examiner* — Ha Dinh Ho
(74) *Attorney, Agent, or Firm* — Venable LLP; Jeffri A. Kaminski (57) ABSTRACT

A vehicle powertrain includes a first electric machine and a second electric machine, a transmission arranged to transmit torque from the electric machines to a pair of driven wheels of a vehicle, where the first electric machine is drivingly connected to a first input shaft of the transmission and a second electric machine is drivingly connected to a second input shaft of the transmission, a first torque path for transmitting torque includes only one gear ratio between the first input shaft and an output shaft of the transmission, and a second torque path for transmitting torque includes two selectable and separately engageable gear ratios between the second input shaft and the output shaft of the transmission, and where the three gear ratios of the first and second torque paths are different from each other.

20 Claims, 5 Drawing Sheets

(51) Int. Cl.
  *B60K 6/547* (2007.10)
  *B60K 17/08* (2006.01)
  *B60W 10/08* (2006.01)
  *F16H 3/72* (2006.01)

(52) U.S. Cl.
  CPC ... *B60L 2240/421* (2013.01); *B60L 2240/423* (2013.01); *B60W 10/08* (2013.01); *B60Y 2200/143* (2013.01); *F16H 3/728* (2013.01); *F16H 2200/2007* (2013.01)

(58) Field of Classification Search
  USPC .......................................................... 74/661
  See application file for complete search history.

(56) References Cited

U.S. PATENT DOCUMENTS

| | | | |
|---|---|---|---|
| 10,144,309 B2* | 12/2018 | Leng | B60L 15/2054 |
| 2004/0112654 A1* | 6/2004 | Kozarekar | B60L 50/61 |
| | | | 180/65.235 |
| 2004/0166980 A1 | 8/2004 | Supina et al. | |
| 2010/0261565 A1 | 10/2010 | Ai et al. | |
| 2012/0203412 A1 | 8/2012 | Nakamura et al. | |
| 2016/0075257 A1 | 3/2016 | Wein et al. | |
| 2016/0137049 A1* | 5/2016 | Zhu | F16H 3/091 |
| | | | 475/5 |

FOREIGN PATENT DOCUMENTS

| | | |
|---|---|---|
| CN | 204222625 U | 3/2015 |
| FR | 2839023 A1 | 10/2003 |
| JP | 2013108604 A | 6/2013 |
| WO | 2007142129 A1 | 12/2007 |
| WO | 2012009744 A1 | 1/2012 |

OTHER PUBLICATIONS

Japanese Office Action dated Oct. 8, 2019 in corresponding JP Application No. 2018-521619, 7 pages.
International Search Report (dated Jul. 7, 2016) for corresponding International App. PCT/EP2015/076037.

* cited by examiner

VEHICLE POWERTRAIN

BACKGROUND AND SUMMARY

The invention relates to a vehicle powertrain comprising two electric machines and a transmission with different gear ratios. The invention can be applied in heavy-duty vehicles, such as trucks, buses and construction equipment and in light vehicles such as cars. Although the invention will be described with respect to a bus, the invention is not restricted to this particular vehicle, but may also be used in other vehicles such as trucks, construction equipment and cars.

The powertrain of an electric vehicle can have many different configurations. It can comprise a single electric machine or several electric machines for providing propulsive and recuperative torque to heavy duty applications. If there are two electric machines they can be drivingly connected to the same pair of driven wheels via a transmission. An example of an electric powertrain is disclosed in WO4173517 A2 where two electric machines are used for driving a pair of wheels and where two different engageable/disengageable gear ratios (gears) are arranged between a first electric machine and the driven wheel pair. A second electric machine can be drivingly connected to the same wheel pair via only one engageable/disengageable gear, which gear uses the same gear ratio as the lower gear of the first electric machine.

It is desirable to provide an alternative powertrain for an electric heavy duty vehicle.

It is desirable to increase tractive torque and power from the powertrain by having two electric machines with a power flow that converges at a common output shaft, and further by decreasing torque interruption during gear shift in the transmission of the powertrain.

According to a first aspect of the invention, a vehicle powertrain comprises;

a first electric machine and a second electric machine, a transmission arranged to transmit torque from said electric machines to a pair of driven wheels of a vehicle, where the first electric machine is drivingly connected to a first input shaft of the transmission and a second electric machine is drivingly connected to a second input shaft of the transmission, a first torque path for transmitting torque comprising only one gear ratio between the first input shaft and an output shaft of the transmission, and a second torque path for transmitting torque comprising two selectable and separately engageable gear ratios between the second input shaft and said output shaft of the transmission, and where the three gear ratios of the first and second torque paths are different from each other.

The first torque path has only one gear ratio where the torque can be transmitted from the first electric machine to the output shaft. For the second torque path one of said two gear ratios can be selected and engaged to transmit torque from the second electric machine to the same output shaft as the first electric machine.

The three gear ratios differ from each other, meaning that there are three different gears that can be used in the powertrain, each gear having a gear ratio that is different compared to the other two gears. The first torque path has only one gear. The second torque path has two different gears that can be selected and engaged one at a time.

With a transmission that converges the power from two electric machines to one output shaft a high total power output can be provided. The transmission further allows the first electric machine to provide torque to the driven wheels while the gear ratio for the second electric machine is shifted from one of the two selectable and separately engageable gear ratios to the other. A powertrain according to the invention thereby can increase tractive torque and total power output. The invention provides a transmission configuration where the gear ratio of the first electric machine is independent from the gear ratios of the second electric machine.

Another advantage with the invention is that it will be more efficient to run the electrical machines at partial loads, when the power of an electric machine is sufficient. With three gear ratios that are different from each other a better working point is obtained for the working electric machines. The result is a vehicle that becomes more energy efficient.

According to a first alternative example the vehicle powertrain comprises that the first electric machine is permanently drivingly connected to the first input shaft and the second electric machine is permanently drivingly connected to the second input shaft. This provides a simple, robust and cost effective solution.

According to a second alternative example the first electric machine is drivingly connected via a selectably engageable first input shaft clutch to the first path input gear wheel and the second electric machine is permanently drivingly connected to the second input shaft. With this alternative the first electric machine can be disengaged from the transmission when torque from the first electric machine is not needed. Thus, when a driving condition occurs where only one electric machine, in this case the second electric machine, is enough to provide tractive torque and power the first electric machine can be disengaged and thereby no energy needs to be used for idling the first electric machine (if engaged).

According to a further development of the two former alternatives the gear ratio of the first torque path is fixed. In a further development of this alternative the first torque path comprises a driving connection comprising a set of gear wheels arranged to transmit torque and arranged between the first input shaft and the output shaft. The first torque path and said set of gear wheels comprises a first path input gear wheel rotatably fixed to the first input shaft, where said first path input gear wheel is drivingly connected to an output shaft gear wheel rotatably fixed to the output shaft.

According to an alternative development the set of gear wheels in the first torque path comprises a first path input gear wheel rotatably fixed to the first input shaft, where said first path input gear wheel is drivingly connected to an output shaft gear wheel drivingly connected to the output shaft via a selectably engageable clutch to the output shaft, and where the second electric machine is permanently drivingly connected to the second input shaft. Compared to having the selectably engageable first input shaft clutch as mentioned as an alternative above, this alternative will have a lower rotational speed at the clutch which normally makes it easier to engage the clutch. Also with this alternative the first electric machine can be disengaged from the transmission when torque from the first electric machine is not needed. In addition also the first input shaft, the first path input gear wheel, the idler gear wheel and the output shaft gear wheel are disengaged together with the first electric machine.

Thus, when a driving condition occurs where only one electric machine, in this case the second electric machine, is enough to provide tractive torque and power the first electric machine together with all the mentioned gear wheels can be disengaged and thereby energy consumption can be further decreased.

According to an alternative development the set of gear wheels in the first torque path comprises that said first path input gear wheel is in mesh with an idler gear wheel rotatably loose on an idler shaft, and where the idler gear wheel is in mesh with the output shaft gear wheel. This gives the possibility to provide an even higher gear ratio for the first torque path.

According to a further alternative example the second torque path comprises a second path input gear wheel of the second input shaft rotatably fixed to the second input shaft, where said second path input gear wheel is in mesh with a first primary shaft gear wheel rotatably fixed on a primary shaft, and where a second primary shaft gear wheel is rotatably fixed on the primary shaft, and where further the second primary shaft gear wheel is in mesh with a first lay shaft gear wheel rotatably fixed on a lay shaft, and where a second lay shaft gear wheel rotatably fixed on said lay shaft is in mesh with an output shaft loose gear wheel rotatably loose on the output shaft.

According to a further development of the former alternative a selectably engageable output shaft clutch in a first position is arranged to drivingly connect the output shaft loose gear wheel to the output shaft. In a further alternative said selectably engageable output shaft clutch in a second position is arranged to drivingly connect the second primary shaft gear wheel or the primary shaft to the output shaft. This provides the possibility to select and engage either one of the two gear ratios available in the second torque path.

According to a further development of the former alternatives the three gear ratios can be configured in one of different ways as follows:
- the fixed gear ratio of the first torque path can be between the ratios of the two other gear ratios of the second torque path. This provides the possibility to drive both the electric machines within a relatively wide vehicle speed range
- the fixed gear ratio of the first torque path can be lower compared to the ratios of the two other gear ratios of the second torque path. This provides the possibility to drive within a very wide vehicle speed range, but only within a narrower vehicle speed range with both electric machines.
- the fixed gear ratio of the first torque path is higher compared to the ratios of the two other gear ratios of the second torque path. This also provides the possibility to drive within a very wide vehicle speed range, but only within a narrower vehicle speed range with both electric machines.

According to a further development of the former alternatives the output shaft is arranged coaxially inside the primary shaft. Further, rotational axes of the shafts of the transmission and of both said electric machines are arranged in parallel. In addition the first and the second electric machine are arranged axially at the same position and adjacent to each other. Each of the mentioned features contributes to a compact and efficient powertrain solution.

According to a further development of the first (main) alternative above or the alternative where the fixed gear ratio of the first torque path is higher compared to the ratios of the two other gear ratios of the second torque path; the first electric machine and the second electric machine are of a different type and/or of a different size. Different combinations are possible. In one exemplified combination the first electric machine is an asynchronous electric machine and the second electric machine is a synchronous electric machine. In a further example the first electric machine is a reluctance electric machine and the second electric machine is a synchronous electric machine. Since both an asynchronous and a reluctance electric machine can be cheaper (compared to a synchronous electric machine) and both are more effective at high rotational speeds (high gear ratios) these alternatives can provide cost advantage with still adequate powertrain performance.

The term "drivingly connected" typically means that a first component is connected to a second component in a manner allowing a transfer of a rotational movement and/or rotational torque from the first component to the second component. Therefore, the term encompasses a functional construction in which two components are connected such that the rotational speed of the first component corresponds to the rotational speed of the second component. However, the term also encompasses a functional construction in which there is a ratio between the rotational movement of the first component and the rotational movement of the second component, i.e., the rotational speed of the second component is proportional to the rotational speed of the first component.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
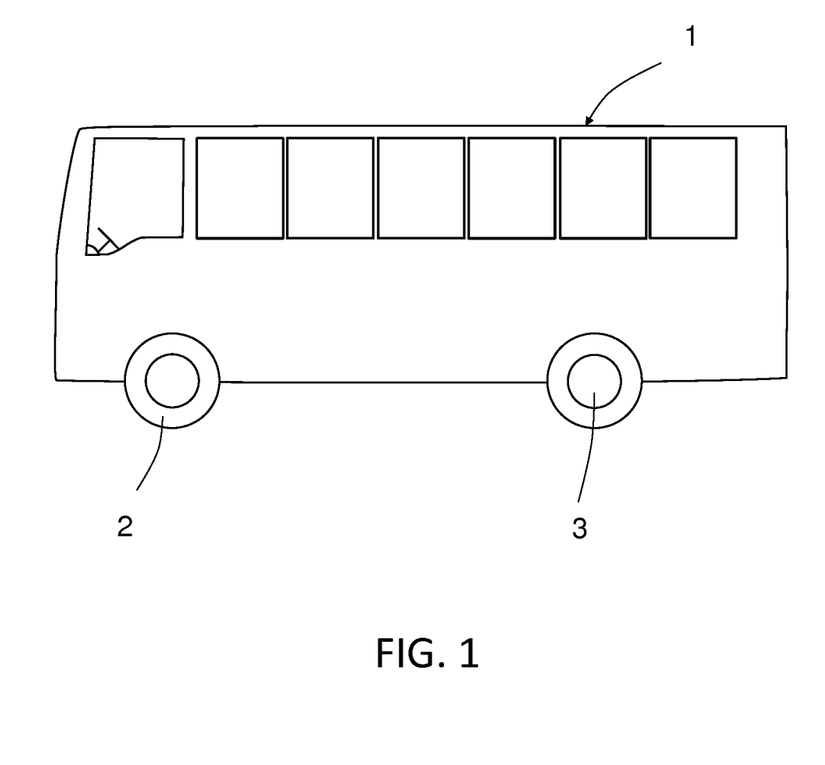
FIG. 1 shows a schematic vehicle provided with a vehicle powertrain according to an embodiment of the invention.

The disclosure concerns a powertrain in an electric vehicle. With reference to FIG. 1 of the drawings, the powertrain may for example be included in a heavy or light bus 1 having a pair of front wheels 2 and a pair of rear wheels 3 which function as driving wheels, and where the driving wheels are driven by the powertrain.

Figure 2:
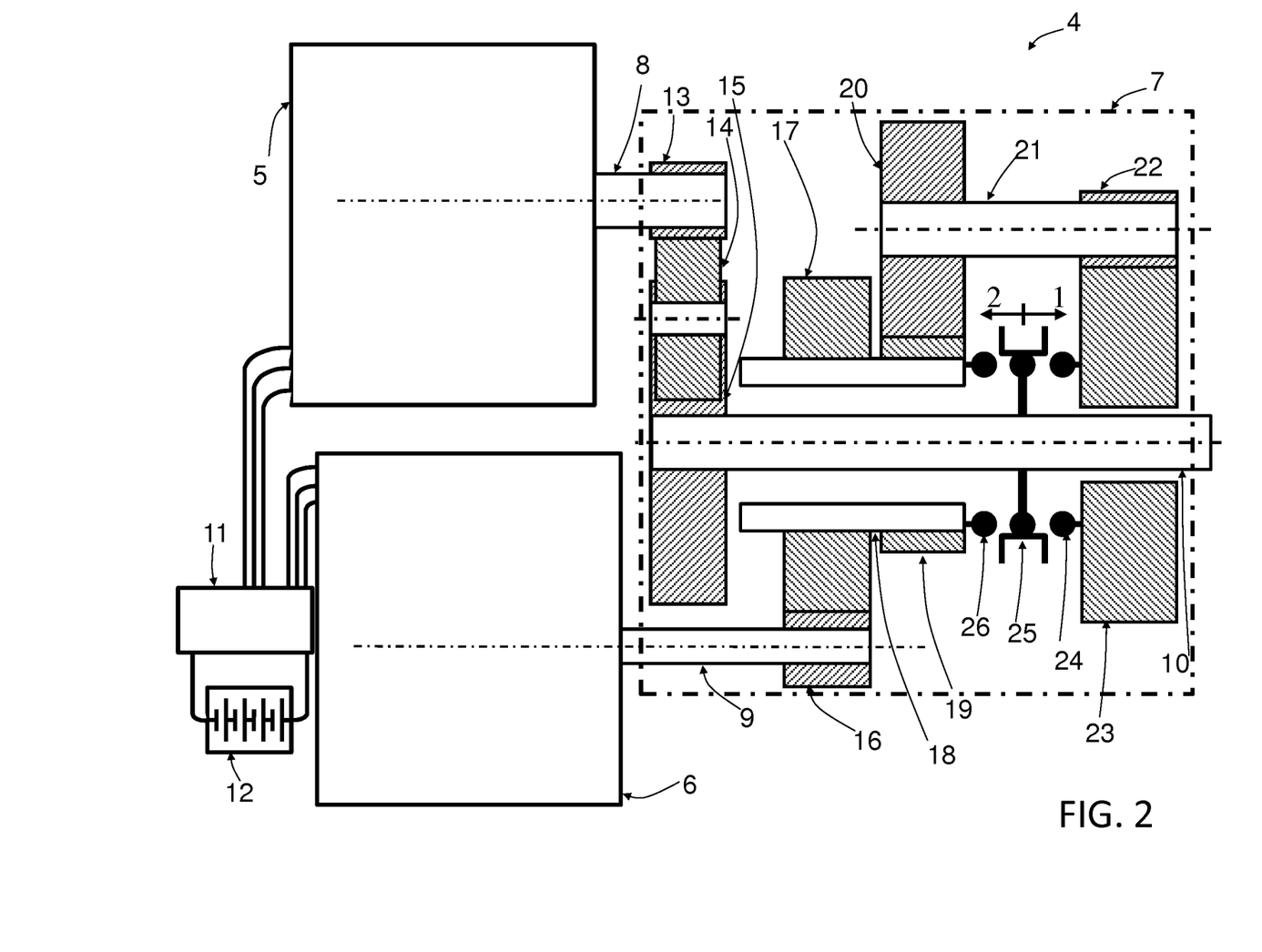
FIG. 2 to 5 show powertrains according to different embodiments of the invention.

FIG. 2 shows a schematic illustration of a simplified example embodiment of a vehicle powertrain 4 comprising a first electric machine 5 and a second electric machine 6. The electric machines are electrically connected to an electrical storage system 12 via power electronics 11. The electrical storage system, power electronics and electric machines as such are known in the art and will therefore not be further described. The first electric machine 5 and the second electric machine 6 can have the same specification and configuration, that is; same model and performance. Having electric machines with the same specification can provide volume and cost advantages. It is also possible to have two different electric machines, for example one cheaper asynchronous electric machine and one synchronous electric machine, or as a further alternative the first electric machine can be a reluctance electric machine and the second electric machine is a synchronous electric machine. An asynchronous or a reluctance electric machine is relatively effective at high rotational speeds. Thus, if the first torque path is provided with a relatively high gear ratio and an asynchronous or a reluctance electric machine, and the second torque path is provided with a synchronous electric machine, this could also give cost advantage with still adequate powertrain performance. Please note that other combinations of different electric machines are also possible. The electric machines are drivingly connected to a transmission 7 arranged to transmit torque from said electric machines to the driven wheels 3. The first electric machine is drivingly connected to a first input shaft 8 of the transmission 7 and the second electric machine is drivingly connected to a second input shaft 9 of the transmission 7.

A first torque path for transmitting torque comprises only one gear ratio between the first input shaft 8 and an output shaft 10 of the transmission 7. The output shaft is drivingly connected to the driven wheels 3 in a known way (not shown). A second torque path comprises two selectable and separately engageable gear ratios between the second input shaft 9 and said output shaft 10 of the transmission. A configuration of a set of gear wheels of the first and the second torque paths respectively are configured such that the three gear ratios of the first and second torque paths are different from each other.

As disclosed in FIG. 2 the set of gear wheels of the first torque path comprises a first path input gear wheel 13 that is rotatably fixed to the first input shaft 8. Said first path input gear wheel 13 is in mesh with an idler gear wheel 14 that is rotatably loose arranged on an idler shaft. As an alternative the idler gear wheel can be rotatably fixed to the idler shaft and instead the idler shaft can be rotatably arranged in bearings arranged in a transmission housing (not disclosed). As a last step in the transmission the idler gear wheel is in mesh with an output shaft gear wheel 15 that is rotatably fixed to the output shaft 10.

The set of gear wheels of the second torque path comprises a second path input gear wheel 16 of the second input shaft that is rotatably fixed to the second input shaft 9. Said second path input gear wheel 16 is in mesh with a first primary shaft gear wheel 17 that is rotatably fixed on a primary shaft 18. A second primary shaft gear wheel 19 is rotatably fixed on the primary shaft 18. The second primary shaft gear wheel 19 is in mesh with a first lay shaft gear wheel 20 that is rotatably fixed on a lay shaft 21. A second lay shaft gear wheel 22 is rotatably fixed on said lay shaft 21 and where said second lay shaft gear wheel 22 is in mesh with an output shaft loose gear wheel 23 rotatably loose on the output shaft 10. A selectably engageable output shaft clutch 25 is in a first position 24 arranged to drivingly connect the output shaft loose gear wheel 23 to the output shaft 10 and in a second position 26 arranged to drivingly connect the primary shaft 18 to the output shaft 10. Alternatively, the output shaft clutch 25 can be arranged to drivingly connect the second primary shaft gear wheel 19 to the output shaft 10. The selectably engageable output shaft clutch 25 in the shown example also has a third position where the clutch is arranged to be in neutral. When in neutral the second torque path is deactivated and torque only from the first electric machine can be transmitted to the driven wheels 3. Further, the output shaft 10 is arranged coaxially inside the primary shaft 18. The output shaft 10 is longer than the primary shaft, and extends outside both axial ends of the primary shaft in order to have space for the gear wheels 15, 23 and the clutch 25. As can be seen the rotational axes of the shafts of the transmission and of both said electric machines are arranged in parallel. The first and the second electric machines are further arranged axially at the same position and adjacent to each other.

Thus, in the disclosed configuration of FIG. 2 the first electric machine 5 is permanently drivingly connected to the first input shaft 8 and the second electric machine 6 is permanently drivingly connected to the second input shaft 9. The gear ratio of the first torque path is fixed, meaning that there is only one gear ratio. This provides a simple and robust solution.

The set of gear wheels for the two torque paths are selected such that the three gear ratios all differ from each other. The fixed gear ratio of the first torque path can be selected as to be between the ratios of the two other gear ratios of the second torque path, or the fixed gear ratio of the first torque path can be selected as to be lower compared to the ratios of the two other gear ratios of the second torque path, or the fixed gear ratio of the first torque path can be selected as to be higher compared to the ratios of the two other gear ratios of the second torque path.

The selection of gear ratios depends on desired performance of the powertrain.

Figure 3:
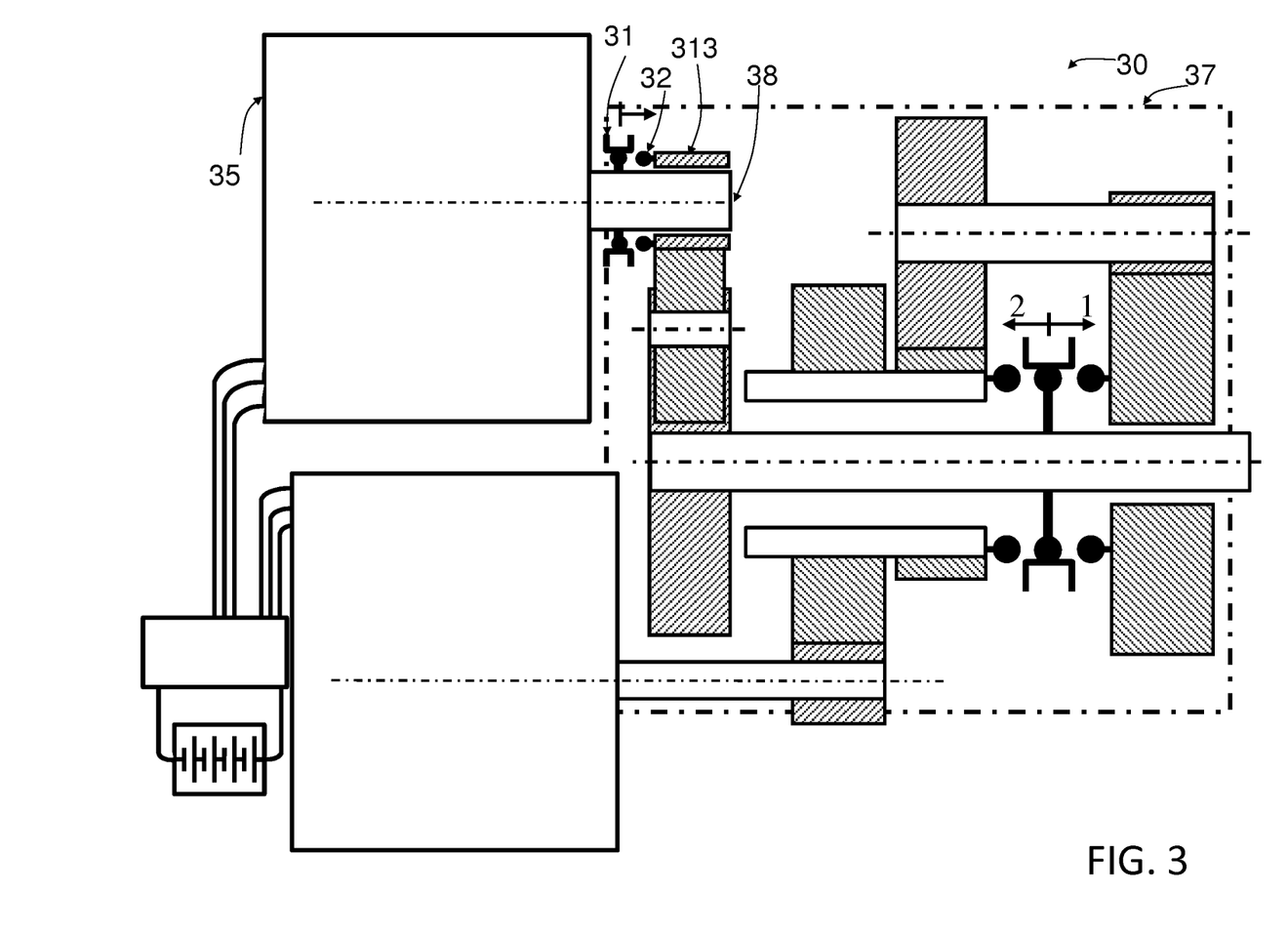

FIG. 3 discloses an alternative powertrain 30 similar to the powertrain 4 of FIG. 2. The embodiment of FIG. 3 differs from the embodiment of FIG. 2 only in that a first electric machine 35 is drivingly connected via a selectably engageable first input shaft clutch 31 to the first path input gear wheel 313. Thus, as can be seen the first path input gear wheel 313 is rotatably loose to the first input shaft 38. The disclosed first input shaft clutch 31 has two positions, an engaged position 32 and a disengaged position (as shown).

Figure 4:
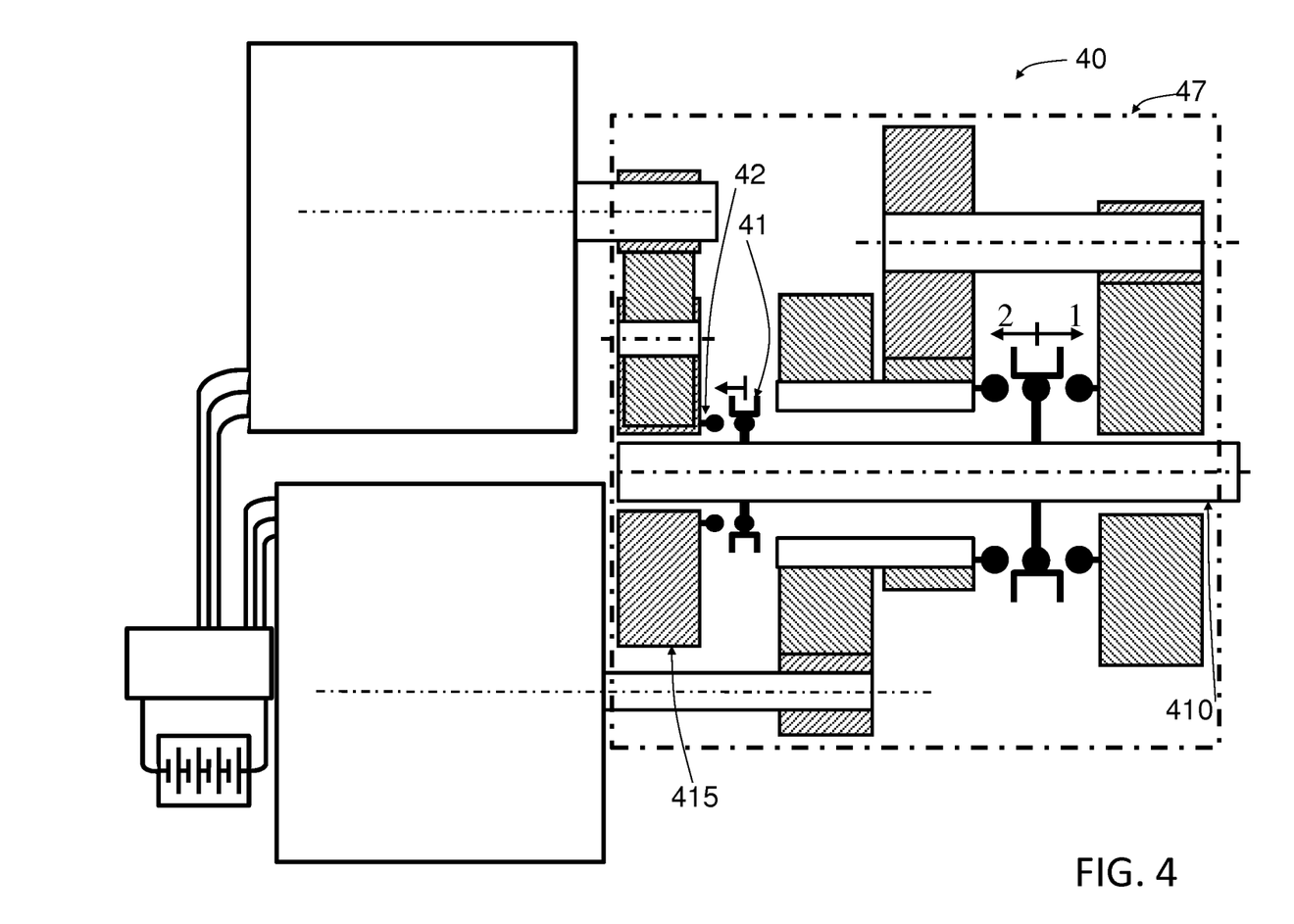

FIG. 4 discloses an alternative powertrain 40 similar to the powertrain 4 of FIG. 2. The embodiment of FIG. 4 differs from the embodiment of FIG. 2 only in that an output shaft gear wheel 415 is drivingly connected to an output shaft 410 via a selectably engageable clutch 41. Further, the output shaft gear wheel 415 is rotatably loose to the output shaft 410. The disclosed clutch 41 has two positions, an engaged position 42 and a disengaged position (as shown).

Figure 5:
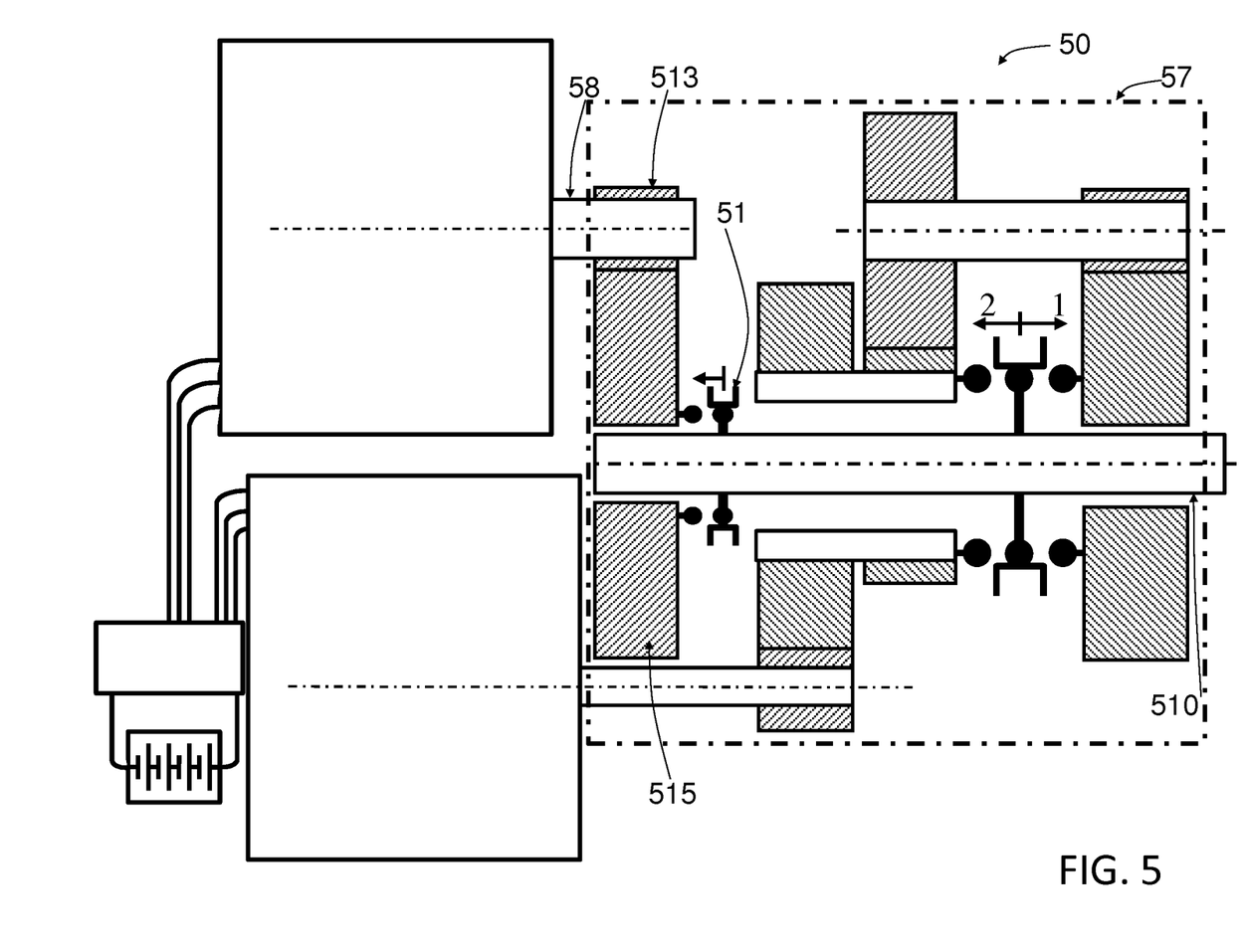

FIG. 5 discloses an alternative powertrain 50 similar to the powertrain 40 of FIG. 4. The only difference between the embodiment of FIG. 5 and FIG. 4 is that in FIG. 5 there is no idler gear wheel with idler shaft. Instead a first path input gear wheel 513 is directly in mesh with an output shaft gear wheel 515.

In alternative embodiments of the powertrain in FIG. 5 a clutch 51 for drivingly connecting the output shaft gear wheel 515 to the output shaft 510 can be removed (as in FIG. 2) or instead arranged to drivingly connect the input shaft gear wheel 513 to the first input shaft 58 (as in FIG. 3).

The clutches 25, 31 and 41 are in the figures disclosed as dog clutches, but alternatively at least one or several of them can be of a friction clutch type.

Reference signs mentioned in the claims should not be seen as limiting the extent of the matter protected by the claims, and their sole function is to make claims easier to understand.

It is to be understood that the powertrain can provide both propulsive and recuperative torque from one or both electric machines in the powertrain.

It is to be understood that the present invention is not limited to the embodiments described above and illustrated in the drawings; rather, the skilled person will recognize that many changes and modifications may be made within the scope of the appended claims.

The invention claimed is:
1. A vehicle powertrain comprising; a first electric machine and a second electric machine, a transmission arranged to transmit torque from electric machines to a pair of driven wheels of a vehicle, where the first electric machine is drivingly connected to a first input shaft of the transmission and the second electric machine is drivingly connected to a second input shaft of the transmission, wherein a first torque path for transmitting torque comprises only one gear ratio between the first input shaft and an output shaft of the transmission, and a second torque path for transmitting torque comprises two selectable and separately engageable gear ratios between the second input shaft and the output shaft of the transmission, and where the three gear ratios of the first and second torque paths are different from each other, wherein the second torque path comprises a second path input gear wheel of the second input shaft rotatably fixed to the second input shaft, where the second path input gear wheel is in mesh with a first primary shaft gear wheel rotatably fixed on a primary shaft, and where a second primary shaft gear wheel is rotatably fixed on the primary shaft, and where further the second primary shaft gear wheel is in mesh with a first lay shaft gear wheel rotatably fixed on a lay shaft, and where a second lay shaft gear wheel rotatably fixed on the lay shaft is in mesh with an output shaft loose gear wheel rotatably loose on the output shaft.

2. A vehicle powertrain as in claim 1, wherein the first electric machine is permanently drivingly connected to the first input shaft and the second electric machine is permanently drivingly connected to the second input shaft.

3. A vehicle powertrain as in claim 1, wherein the first electric machine is drivingly connected via a selectably engageable first input shaft clutch to a first path input gear wheel and the second electric machine is permanently drivingly connected to the second input shaft.

4. A vehicle powertrain as in claim 2, wherein the gear ratio of the first torque path is fixed.

5. A vehicle powertrain as in claim 4, wherein the first torque path comprises a driving connection comprising a set of gear wheels arranged to transmit torque and arranged between the first input shaft and the output shaft.

6. A vehicle powertrain as in claim 5, wherein the first torque path comprises a first path input gear wheel rotatably fixed to the first input shaft, where the first path input gear wheel is drivingly connected to an output shaft gear wheel rotatably fixed to the output shaft.

7. A vehicle powertrain as in claim 5, wherein the first torque path comprises a first path input gear wheel rotatably fixed to the first input shaft, where the first path input gear wheel is drivingly connected to an output shaft gear wheel drivingly connected to the output shaft via a selectably engageable clutch to the output shaft and the second electric machine is permanently drivingly connected to the second input shaft.

8. A vehicle powertrain as in claim 6, wherein the first path input gear wheel is in mesh with an idler gear wheel rotatably loose on an idler shaft, and the idler gear wheel is in mesh with the output shaft gear wheel.

9. A vehicle powertrain as in claim 1, wherein a selectably engageable output shaft clutch in a first position is arranged to drivingly connect the output shaft loose gear wheel to the output shaft.

10. A vehicle powertrain as in claim 1, wherein the selectably engageable output shaft clutch in a second position is arranged to drivingly connect the second primary shaft gear wheel or the primary shaft to the output shaft.

11. A vehicle powertrain as in claim 1, wherein the fixed gear ratio of the first torque path is between the ratios of the two other gear ratios of the second torque path.

12. A vehicle powertrain as in claim 1, wherein the fixed gear ratio of the first torque path is lower compared to the ratios of the two other gear ratios of the second torque path.

13. A vehicle powertrain as in claim 1, wherein the fixed gear ratio of the first torque path is higher compared to the ratios of the two other gear ratios of the second torque path.

14. A vehicle powertrain as in claim 1, wherein the output shaft is arranged coaxially inside the primary shaft.

15. A vehicle powertrain as in claim 1, wherein rotational axes of the shafts of the transmission and of both the electric machines are arranged in parallel.

16. A vehicle powertrain as in claim 15, wherein the first and the second electric machines are arranged axially at the same position and adjacent to each other.

17. A vehicle powertrain as in claim 1, wherein the first electric machine and the second electric machine are of a different type and/or of a different size.

18. A vehicle powertrain as in claim 17, wherein the first electric machine is an asynchronous electric machine or a reluctance electric machine and the second electric machine is a synchronous electric machine.

19. A vehicle powertrain comprising; a first electric machine and a second electric machine, a transmission arranged to transmit torque from electric machines to a pair of driven wheels of a vehicle, where the first electric machine is drivingly connected to a first input shaft of the transmission and the second electric machine is drivingly connected to a second input shaft of the transmission, wherein a first torque path for transmitting torque comprises only one gear ratio between the first input shaft and an output shaft of the transmission, and a second torque path for transmitting torque comprises two selectable and separately engageable gear ratios between the second input shaft and the output shaft of the transmission, and where the three gear ratios of the first and second torque paths are different from each other, wherein the first electric machine is permanently drivingly connected to the first input shaft and the second electric machine is permanently drivingly connected to the second input shaft, wherein the second torque path comprises a second path input gear wheel of the second input shaft rotatably fixed to the second input shaft, where the second path input gear wheel is in mesh with a first primary shaft gear wheel rotatably fixed on a primary shaft, and where a second primary shaft gear wheel is rotatably fixed on the primary shaft, and where further the second primary shaft gear wheel is in mesh with a first lay shaft gear wheel rotatably fixed on a lay shaft, and where a second lay shaft gear wheel rotatably fixed on the lay shaft is in mesh with an output shaft loose gear wheel rotatably loose on the output shaft.

20. A vehicle powertrain comprising; a first electric machine and a second electric machine, a transmission arranged to transmit torque from electric machines to a pair of driven wheels of a vehicle, where the first electric machine is drivingly connected to a first input shaft of the transmission and the second electric machine is drivingly connected to a second input shaft of the transmission, wherein a first torque path for transmitting torque comprises only one gear ratio between the first input shaft and an output shaft of the transmission, and a second torque path for transmitting torque comprises two selectable and separately engageable gear ratios between the second input shaft and the output shaft of the transmission, and where the three gear ratios of the first and second torque paths are different from each other, wherein the first electric machine is drivingly connected via a selectably engageable first input shaft clutch to a first path input gear wheel and the second electric machine is permanently drivingly connected to the second input shaft, wherein the second torque path comprises a second path input gear wheel of the second input shaft rotatably fixed to the second input shaft, where the second path input gear wheel is in mesh with a first primary shaft gear wheel rotatably fixed on a primary shaft, and where a second primary shaft gear wheel is rotatably fixed on the primary shaft, and where further the second primary shaft gear wheel is in mesh with a first lay shaft gear wheel rotatably fixed on a lay shaft, and where a second lay shaft gear wheel rotatably fixed on the lay shaft is in mesh with an output shaft loose gear wheel rotatably loose on the output shaft.

* * * * *